E. R. & W. P. Spear.
Revolving Rake.

No. 89,950.  Patented May 11 1869.

Witnesses  Inventor
  E. R. & W. P. Spear
per
Attorneys

United States Patent Office.

ERASTUS R. SPEAR AND WILLIAM P. SPEAR, OF ORLAND, INDIANA.

Letters Patent No. 89,950, dated May 11, 1869.

IMPROVEMENT IN HORSE-RAKES.

The Schedule referred to in these Letters Patent and making part of the same.

*To all whom it may concern:*

Be it known that we, ERASTUS R. SPEAR and WILLIAM P. SPEAR, of Orland, in the county of Steuben, and State of Indiana, have invented a new and useful Improvement in Horse Hay-Rakes; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Our invention relates to improvements in horse hay-rakes, and consists in the arrangement of the parts by which the rake is operated to dump the load, as will be hereinafter more fully described.

A are the wheels, which revolve upon the journals of the axle B.

C are the thills, the rear parts of which are attached to the axle B in such a way that their rear ends may project in the rear of the said axle sufficiently to allow the forward ends of the side draw-bars D to be pivoted to them.

Figure 1:
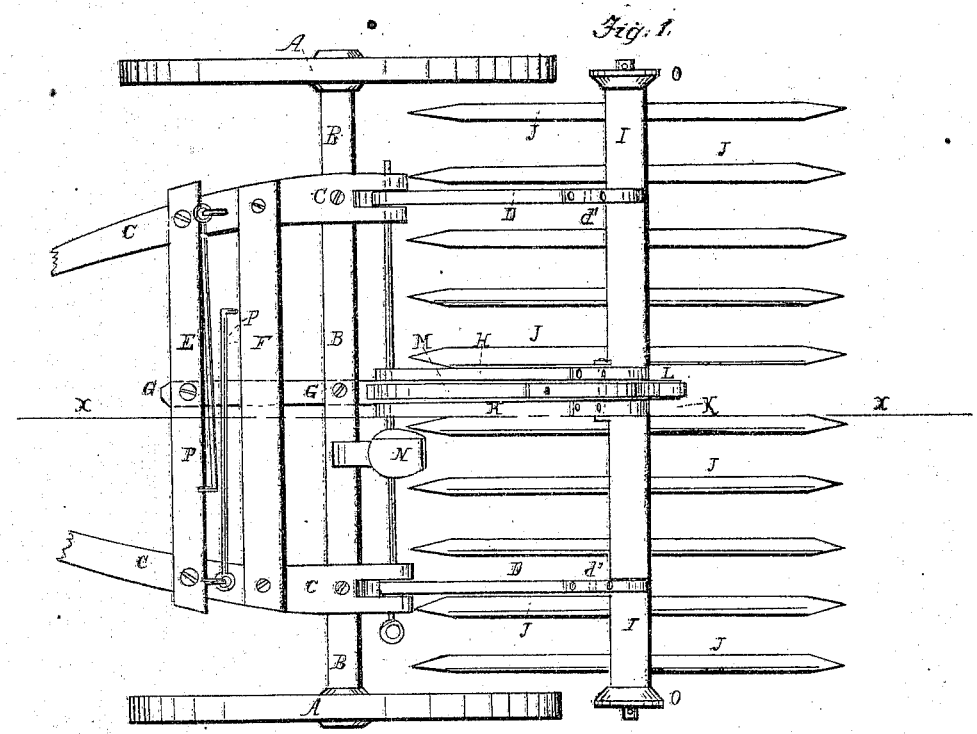
Figure 1 is a top or plan view of our improved rake.

The thills C, in front of the axle B, are connected and held in their proper relative positions by the draw-bar E and foot-bar F, as shown in fig. 1.

G is a bar, which is attached to the middle part of the draw-bar E and axle B, in such a way that its rear end may project in the rear of the axle B, to receive the forward ends of the two parallel draught-bars H, which are pivoted to it, as shown in fig. 1.

I is the rake-head shaft, to which the teeth J are attached in the ordinary manner, and which is pivoted to the rear ends of the side draught-bars D, and to the rear ends of the two central draught-bars H.

Figure 2:
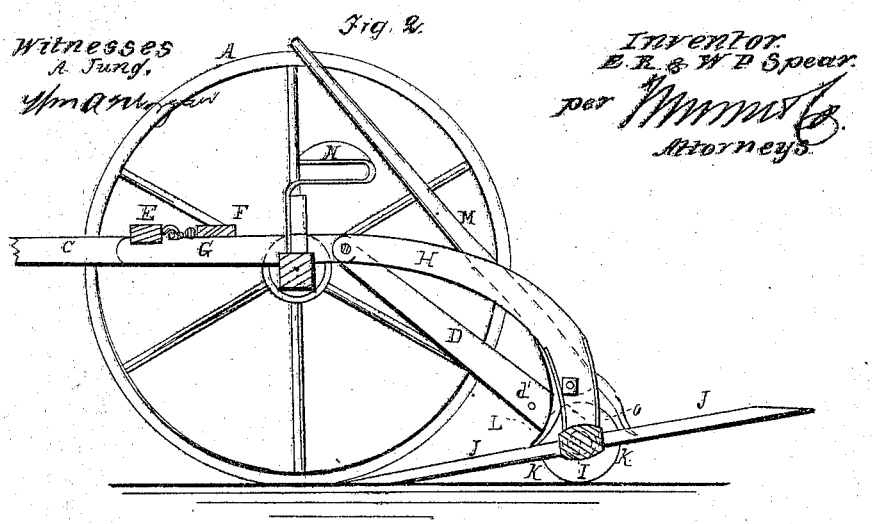
Figure 2 is a vertical cross-section of the same, taken through the line $x\,x$, fig. 1.

To the middle part of the shaft I, between the rear ends of the two central draught-bars H, is rigidly attached a short finger, K, which is made in about the shape shown in fig. 2; that is to say, it is a little broader at its middle part than the thickness of the shaft I, from which middle point it gradually tapers to a point upon each side of the said shaft, the said tooth being parallel with the teeth J.

L is a fork or foot, made in about the shape shown in fig. 2, which rides upon the tooth or finger K, and is securely and rigidly attached to the rear end of the lever M.

The lever M is pivoted to and between the central draught-bars H, at such a distance above the shaft I, that as the upper or free end of the lever M is moved in one or the other direction the proper distance, the point or end of the tooth K may be allowed to pass one or the other arm of the foot L, as may be desired; or, by moving the lever M a less distance in either direction, one or the other arm of the foot L may be made to bear upon one or the other end of the finger K, so as to raise the forward ends of the teeth J to pass over obstructions, or the rear ends of said teeth, to allow the machine to be conveniently backed.

The upper or forward end of the lever M extends up into such a position that it may be conveniently operated by the driver from his seat N.

To journals formed upon or attached to the ends of the shaft I are attached small wheels O, which diminish the friction in operating the rake, and also enable the machine to be backed when necessary.

P are bars, one end of each of which is pivoted to the thills C, near the draw bar E, and upon the other ends of which are formed hooks, which hook into holes $d'$ in the rear parts of the side draught-bars D, when the rake-head is raised above the axle B, so as to support the rake-head in an elevated position when passing from place to place.

The lever M, foot L, and finger or tooth K, are so constructed and arranged, that when left free, they will automatically hold the rake-head I J in proper working-position.

To deposit the collected hay, all that is necessary is to slightly lower the forward end of the lever M, depressing the forward ends of the teeth J, so that they may catch upon the ground, and revolve the rake-head. The foot L, as the rear teeth move forward into working-position, catch the finger K, and hold the said rake-head until again released, by again operating the levers M.

Having thus described our invention,

We claim as new, and desire to secure by Letters Patent—

The lever M, carrying the forked head L, pivoted to and between the curved bars H, whose lower ends embrace the finger or tooth K, upon the rake-head, and whose upper ends are hung to the frame of the machine, all arranged as described, for the purpose specified.

ERASTUS R. SPEAR,
WILLIAM P. SPEAR.

Witnesses:
M. D. WILKINS,
S. L. WHITAKER.